April 4, 1961 T. H. BRINDLE 2,978,153
CABINET STRUCTURE FOR AUTOMOTIVE VEHICLES
Filed March 23, 1956 3 Sheets-Sheet 1
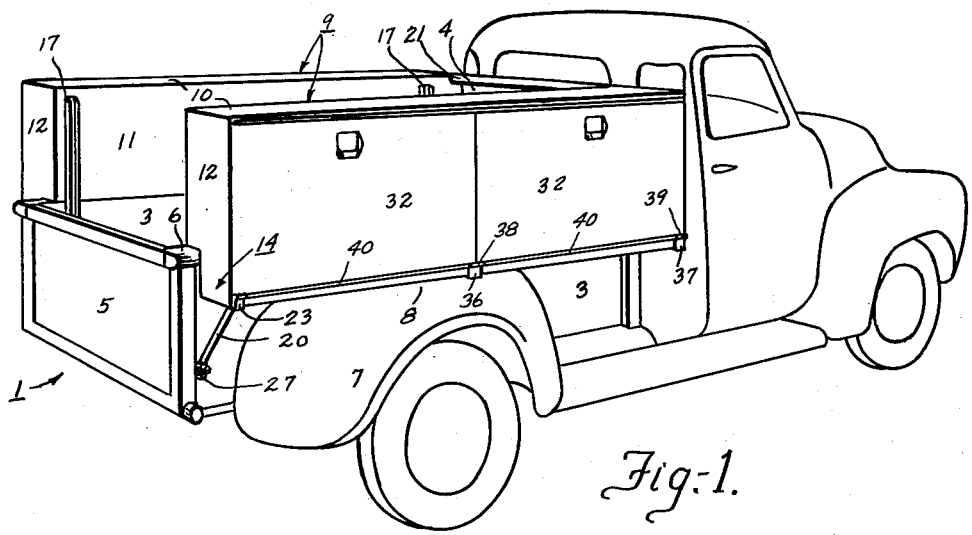
Fig.-1.
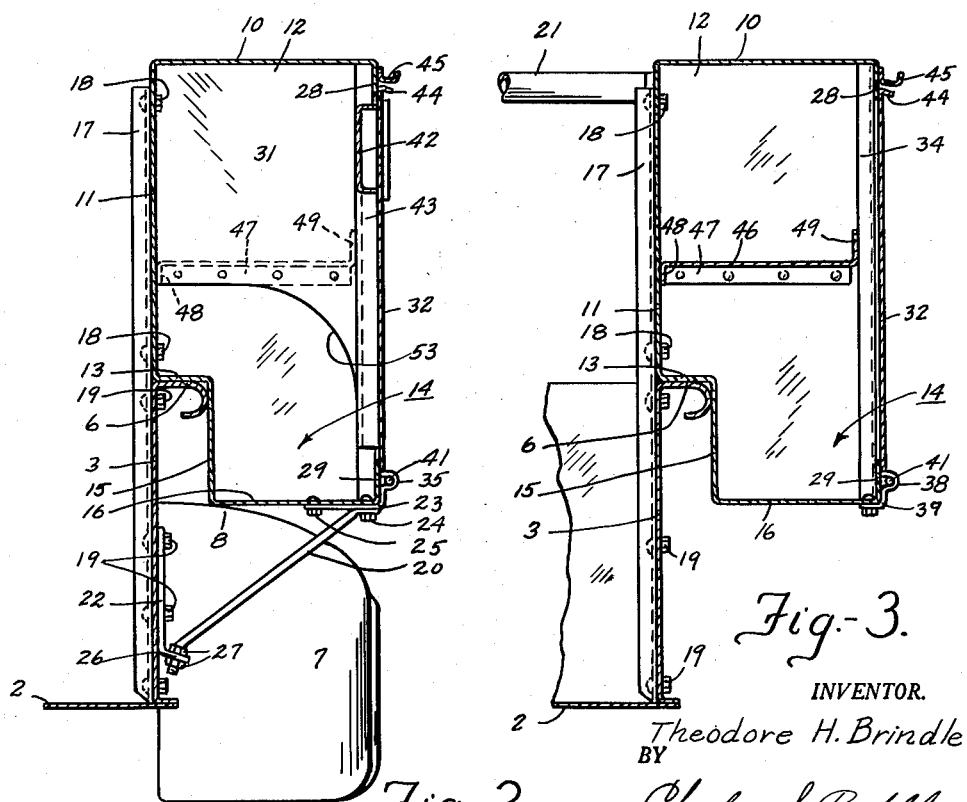
Fig.-2.
Fig.-3.
INVENTOR.
Theodore H. Brindle
BY
Charles S. Penfold
ATTORNEY April 4, 1961 T. H. BRINDLE 2,978,153
CABINET STRUCTURE FOR AUTOMOTIVE VEHICLES
Filed March 23, 1956 3 Sheets-Sheet 2

INVENTOR.
Theodore H. Brindle
BY
Charles S. Penfold
ATTORNEY

April 4, 1961 T. H. BRINDLE 2,978,153
CABINET STRUCTURE FOR AUTOMOTIVE VEHICLES
Filed March 23, 1956 3 Sheets-Sheet 3

INVENTOR.
Theodore H. Brindle
BY
Charles S. Penfold
ATTORNEY

United States Patent Office 2,978,153
Patented Apr. 4, 1961

2,978,153

CABINET STRUCTURE FOR AUTOMOTIVE VEHICLES

Theodore H. Brindle, Laotto, Ind.

Filed Mar. 23, 1956, Ser. No. 573,556

1 Claim. (Cl. 224—42.42)

The invention relates generally to vehicles and more particularly is directed to cabinet structure which is mounted on the vehicle in a unique manner for storage purposes.

The cabinet structure may be employed where desired but is preferably designed and constructed for use with the box of a pickup truck. A truck of this character includes, among other things, a cab and a box or body part at its rear comprising a bottom wall, a front wall adjacent the back of the cab, a pair of parallel vertical side walls and a rear wall constituting a gate. The upper rails or longitudinal edge portions of the side walls are flattened or made tubular to impart rigidity to the side walls. The rear fenders on such trucks are usually located so that their upper portions or crests are spaced appreciable distances below the upper tubular or flattened portions of the side walls of the body. In other words, each side wall and the upper portion of a fender generally define or form what may be referred to as an angle-shaped recess, space or area, the length and depth of which will vary in accord with the shape and location of the fender.

It is recognized that various forms or types of cabinets have heretofore been mounted on the bodies of pickup trucks. In some installations cabinets are welded to the body and in other setups the cabinets are mounted directly on the side walls of the body. When cabinets are thus mounted in the conventional manner the cabinets require considerable bracing and a multitude of fasteners to anchor them in position, particularly if the cabinets are constructed to house heavy material or equipment. In fact, insofar as is known, all of the conventional cabinets on trucks of the above described character are mounted on and above the rails of the side walls and, as a consequence, the cabinets tend to bodily tilt, slide or become displaced, which may be due in part to the shifting of the weight in the cabinets and/or torsional stresses and loosened fasteners. Any tendency toward an unbalanced or teetering condition is of course magnified when the cabinets are tall and/or the material or equipment stored therein is heavy and of a kind that can readily shift or move in the cabinets.

Moreover, insofar as is known, all of the conventional cabinets in use are of such height that they materially block vision through the rear window or windows of the cab.

With the foregoing in mind, one of the principal objects of the invention is to provide cabinets embodying improved principles of design and construction which overcome the disadvantages inherent in the conventional construction above referred to.

More particularly, an important object of the invention is to provide a cabinet with a longitudinally extending recess which is adapted to receive the rail of a side wall so as to afford greater stability for the cabinet when secured to the side wall and greater visibility through the rear window or windows in the cab to promote safety.

A significant object of the invention is to provide a cabinet having a longitudinal recess so that a lower depending portion of the cabinet will be located along the side wall and above the fender in the angle-shaped space or recess defined by such wall and fender as described above. With this unique arrangement the recess, which is not used in conventional installations, is fully utilized to good advantage and at the same time lowers the center of gravity or load closer to the ground to counteract the top-heavy disadvantages inherent in conventional installations.

Another object of the invention is to provide a cabinet having a partition dividing the cabinet into compartments and provided with an opening through which one or more items of relatively long lengths can be extended for accommodation in the cabinet.

A further object of the invention is to provide a tray with abutment means of a particular character in order to prevent longitudinal movement of the tray into either compartment through the opening and locate the tray to provide clearance for the closing of a door on the cabinet.

Other objects of the invention are to provide a cabinet which affords advantages with respect to manufacture, assembly and installation without material alteration to the truck body.

Additional attributes of the invention reside in providing cabinets which are durable, stable, water-proof, and pleasing in their general all-around appearance.

Other objects and advantages of the invention will become apparent when the description hereinafter set forth is considered in conjunction with the drawings annexed hereto.

In the drawings:

Figure 1 is a perspective view of a pickup truck or vehicle showing cabinets, embodying the invention, applied to the side walls of the truck body;

Figure 2 is an enlarged transverse section taken through one of the cabinets and shows in detail the mode of mounting it on a side wall of the body;

Figure 3 is an enlarged transverse section, similar to Figure 2, exemplifying certain details of construction;

Figure 4:
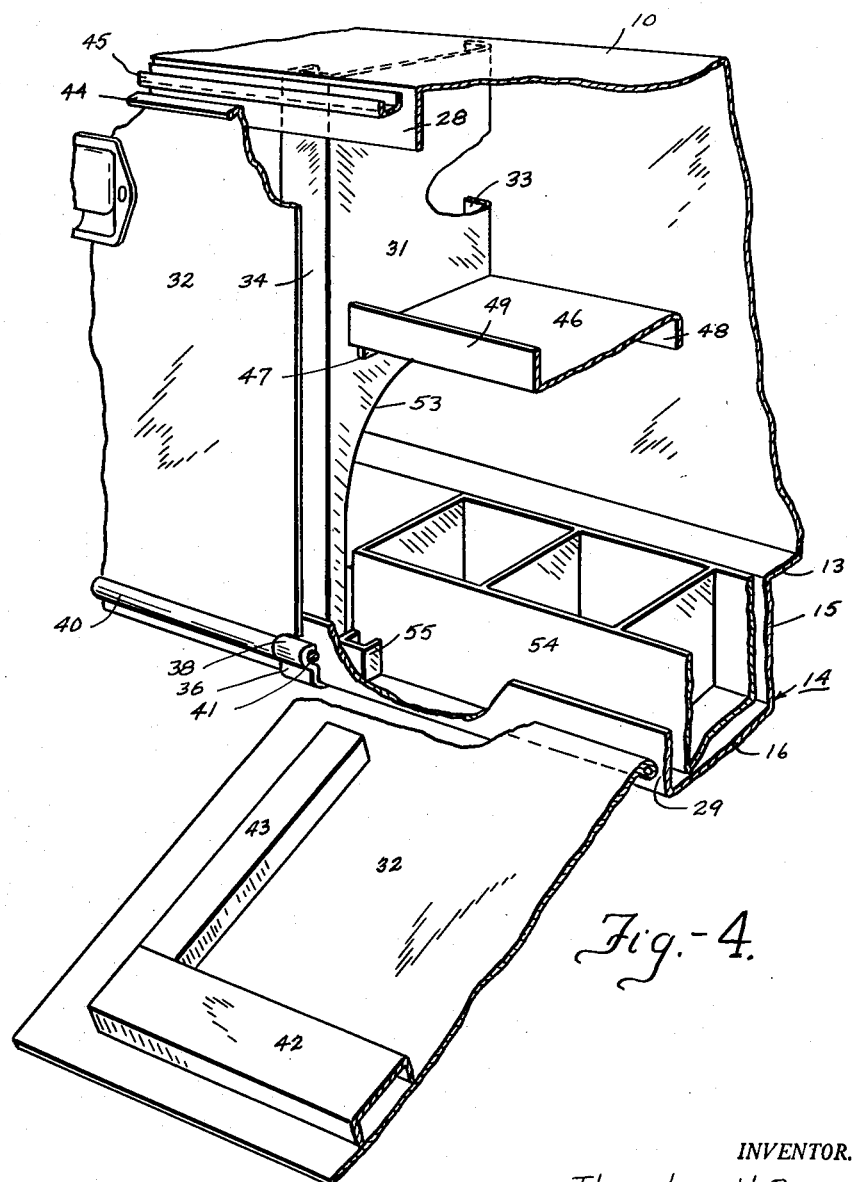
Figure 4 is an enlarged partial perspective view of a cabinet, with portions in section to illustrate structural components thereof and with a door opened to show a tray disposed in the cabinet.

Referring now more particularly to the drawings, the automotive vehicle shown is of a conventional type known as a light pickup truck and, among other things, includes a cab and a box-like body generally designated 1 having a bottom 2, corresponding parallel side walls 3, a forward end wall 4 adjacent the cab, and a pivotal tail gate 5.

The side walls of the body are provided with upper longitudinally extending edges which are turned over to form substantially flat rails 6. The vehicle also includes rear fenders 7 having upper portions 8 (only one fender is illustrated) which are spaced appreciably below the rails and in combination with the side walls define the elongated angle-shaped recesses or areas as depicted in Figure 2.

Cabinets generally designated 9, embodying the invention, are respectively primarily supported on or in relation to the rails 6 and will now be described. The cabinets are substantially identical in design and construction except for their right and left hand characteristics. Each cabinet is elongated and preferably generally rectangular in cross-section and, among other things, includes a top wall 10, a back wall 11, end walls 12, a first bottom wall 13 and a depending offset generally designated 14 having a vertical wall 15 and a wall 16 constituting a second bottom wall. The first bottom wall 13 and the vertical wall 15 define a longitudinally extending recess or rabbet which receives a rail 6 so that the depending offset is disposed in the longitudinal angle-shaped recess defined by side wall 3 and the fender and thereby obtain the full advantage of utilizing this recess or space for storage which is never used in conventional constructions.

The cabinets may be affixed to the truck body in various ways, but as exemplified herein, they are readily detachably connected to the side walls of the body without material alteration to the body. More specifically in this regard, and as shown in Figures 1, 2, 3 and 5 of the drawing, the cabinets are secured in erect positions on the rails, with the back walls 11 of the cabinets disposed above and in the plane of the side walls 3 of the body, by a plurality of channel bars or cleats 17. The back walls and the upper extremities of the bars are provided with holes through which bolts 18 extend to detachably connect the bars to the cabinets. The lower extremities of the bars and the side walls 3 are similarly provided with holes which receive bolts 19 for detachably connecting the bars and/or cabinets to the side walls 3.

The rear extremities of the cabinets are preferably stabilized by angularly disposed braces 20 and their forward extremities by a cross-connector 21, as shown in Figures 1, 2, 3 and 5. More particularly in this regard, a bracket 22 is secured to the exterior surface of each of the side walls 3 by certain of the bolts 19 and a fitting 23 is attached to the underside of each cabinet by fasteners 24 and 25. Each of the brackets is provided with an offset 26 having an aperture therein and each of the braces is provided with a lower offset exteriorly threaded end which extends through the aperture and is clamped to a bracket by a pair of nuts 27. Each brace is also provided with an upper offset end having an aperture therein which receives the fastener 24.

Figure 5:
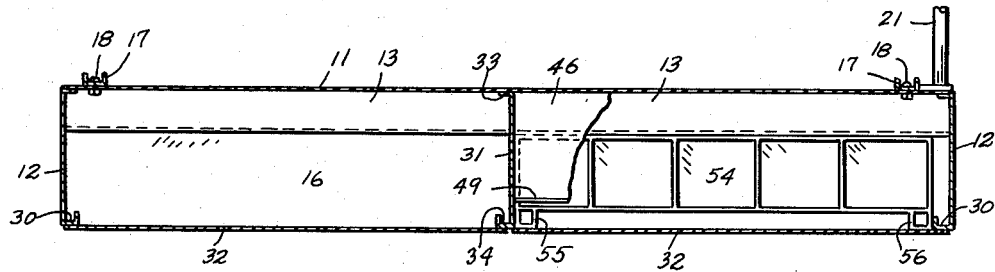
Figure 5 is a horizontal section taken through one of the cabinets and depicts the position of a tray therein.

As shown in Figures 1, 3 and 5, the ends of the connector 21 are attached to the upper portions of the back walls 11 of the cabinets at locations adjacent the forward end walls 12. Although not depicted, the ends of the connector are detachably connected to the cabinets and are comprised of telescoping parts which can be adjusted and locked to firmly detachably tie the cabinets together at their forward extremities.

Attention is directed to the fact that the channel bars 17 are of a length somewhat greater than the heights of the cabinets so their lower extremities extend therebelow and in parallel relation to the vertical wall 15 of the depending offset of each cabinet to afford greater stability to the cabinets. It will be noted that the lower extremities of the bars in combination with the bottom wall 13 and vertical wall 15 of each cabinet define what may be termed a channel formation of a size which snugly receives a rail as shown in Figures 2 and 3, and thereby further improves the factor of stabilization.

The top wall of each cabinet is provided with a front depending flange 28; the bottom wall of the offset 14 with an upturned front flange 29; and the end walls 12 with inturned front flanges 30. The front flanges on each cabinet are all disposed in substantially the same plane and may be considered to constitute the front wall thereof. These flanges define a large rectangular opening which is divided lengthwise by a vertical partition 31 to provide a pair of corresponding openings which are normally closed by a pair of corresponding doors 32. Each partition has a rear flange 33 welded to the back wall of a cabinet and a front channel flange 34 welded at its ends to the inner surfaces of the depending and upturned flanges 28 and 29 as shown in Figure 4 to impart stability to the structure.

The doors may be attached to the cabinets in any manner desired but is best exemplified in Figures 1 through 4. This is accomplished by providing the fitting 23, above referred to, with an upturned portion having a bearing 35 formed thereon. An additional pair of fittings 36 and 37 are secured to the bottom wall 16 of the depending offset 14 adjacent the partition and the forward extremity of each cabinet. The fittings 36 and 37 are respectively provided with bearings 38 and 39 which are aligned with the bearing 35. Each of the doors is provided with a tubular bead 40 at its lower marginal edge. The bead on the left door as viewed in Figures 1 and 4 is disposed between and in alignment with the bearings 35 and 38, and the bead on the right door between the bearings 38 and 39. A pivot rod 41 extends through the bearings and beads to mount the doors for individual pivotal movement.

The doors are preferably reenforced by a longitudinal channel member 42 and a pair of transverse channel members 43 which are welded to the inner surface of each door as shown in Figures 2 and 4. These channel members impart rigidity to the doors where required and are so located that when the doors close the openings in the cabinets they project inwardly into the openings. Each of the doors may be provided with a suitable latch or lock as shown in Figures 1 and 4.

The upper portion of each door is provided with a longitudinal outwardly extending inclined flange 44 which takes a position below an eavestrough 45 secured to the depending flange 28 of each cabinet. It will be noted that the eavestrough overhangs the inclined flange in order to prevent entry of water or foreign matter into the cabinets.

Figure 6:
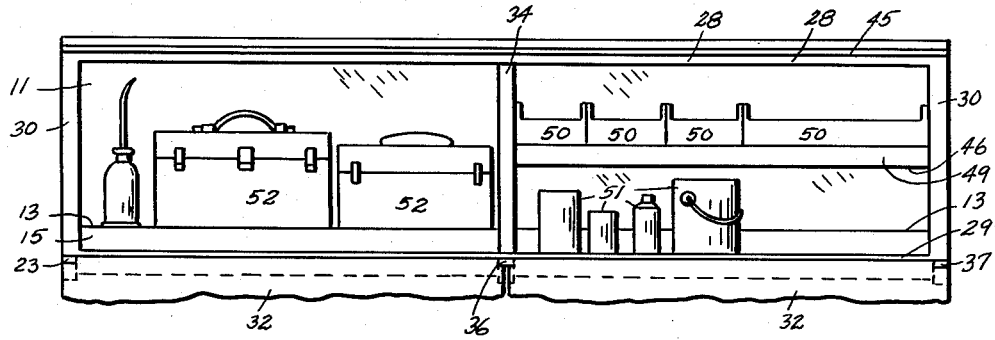
Figure 6 is an elevational view of a cabinet illustrating the interior thereof with different supplies and equipment stored in the compartments.

The interiors of the cabinets may be designed and constructed in various ways to accommodate different items, materials and/or equipment. As illustrated in Figures 2 through 6 of the drawing, a shelf 46 is secured in the right hand compartment of each cabinet. The ends of each shelf have downturned flanges 47 which are respectively riveted or welded to the partition 31 and the forward end wall 12. The shelf is further provided with a rear downturned flange 48 which may be welded or riveted to the back wall of the cabinet and an upturned front flange 49 which serves to retain items such as receptacles 50 on the shelf as shown in Figure 6. This figure also discloses a plurality of cans 51, containing different materials, disposed in the depending offset 14 below the shelf 46 in the right compartment, and tool boxes or kits 52 disposed on the bottom wall 13 in the left compartment. The bottom wall 13 and the bottom wall 16 of the offset respectively serve as rear and front shelves extending continuously throughout the full length of the cabinet for supporting any items desired. As illustrated in Figures 2 and 4 of the drawing, a lower portion of the partition 31 is cut away to provide a clearance opening 53 so that relatively long items such as a shovel or rods can be extended through the opening for support on the walls 13 and 16.

Figure 8:
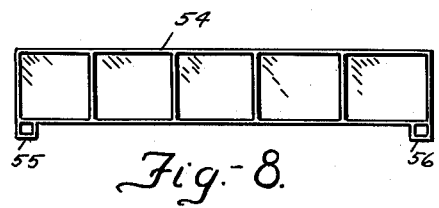
Figure 8 is a top view of a tray that can be utilized in any of the different cabinet arrangements illustrated.

In Figures 4, 5 and 8 of the drawing there is depicted a tray 54 which can be disposed in the depending offset 14 of either compartment. This tray is preferably of a depth corresponding to the height of the depending offset 14, so that its top side and the bottom wall 13 are level in order to afford a larger supporting area for certain items. The width of the tray is somewhat less than the cross-dimension of the depending offset and its length is somewhat less than the length of the offset. The front wall of the tray adjacent its ends is preferably provided with a pair of lugs 55 and 56 welded thereto. These lugs constitute abutments which engage the upturned flange 29 to maintain the tray in a rearward position against the vertical wall 15 in order to provide clearance for the reenforcing channel members 43 on a door when the latter is closed. When a tray is disposed, for example, in the right compartment, the abutment 55 may engage the partition to prevent movement of the tray into the left compartment, and when a tray is disposed in the left compartment, the abutment 56 may engage the partition to prevent movement of the tray into the right compartment.

Figure 7:
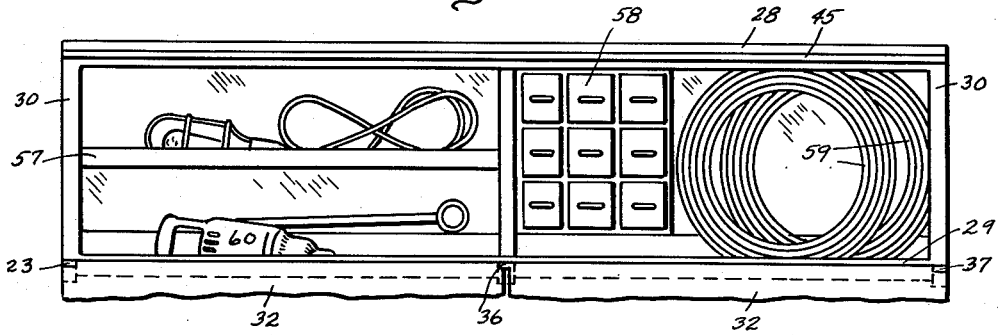
Figure 7 is an elevational view of a cabinet, similar to Figure 6, but having another arrangement therein for storing supplies and equipment different from those in Figure 6.

As exemplified in Figure 7 of the drawing, the left compartment of a cabinet is provided with a shelf 57 for different items, whereas the right compartment is provided with a bank or unit of drawers 58, in lieu of a shelf like 46. The depending offset in either compartment may be utilized to support a roll or rolls of coiled tubing 59 or an electric drill 60 such as is disclosed in Figure 7.

In view of the foregoing, it will be manifest that the cabinets are well designed and constructed, and afford a greater capacity for storage than any of the known conventional cabinets and that the normally unused areas of a vehicle above the rear fenders and along the sides of the body are made available for use. Of further importance is the fact that the depending offsets afford places for storage on a lower level than that permitted by conventional cabinets and in consequence thereof the overall heights of the cabinets can be reduced to promote vision without reducing the storage capacity of the cabinets. It will also be evident that the longitudinal recess in each cabinet in combination with the upright channel bars provide a formation which receives a rail on the side wall or support of the body to promote stabilization when the cabinets are attached to the body by the bars, braces and bolts. The body is not materially altered because installation of the cabinets is readily accomplished by merely drilling holes in the side walls of the body.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described, except as claimed herein.

I claim:

In combination: a vehicle having a body comprising a bottom wall and upstanding side walls with wheel housings respectively disposed adjacent the side walls so that the upper portions of the housings are spaced appreciably below the upper longitudinal edge portions of the side walls, a pair of upstanding cabinets provided with back walls and longitudinally extending recesses adjacent their lower extremities, and means securing the cabinets in place with the recesses respectively receiving the upper portions of the side walls so that portions of the cabinets depend alongside the side walls in the spaces between the upper edges of the side walls and the upper portions of the housings and the back walls of the cabinet project upwardly in vertical planes to substantially constitute extensions of said side walls.

References Cited in the file of this patent

UNITED STATES PATENTS

| | | |
|---|---|---|
| 1,216,153 | McKnight | Feb. 13, 1917 |
| 1,379,228 | Swift | May 24, 1921 |
| 1,717,184 | Browne | June 11, 1929 |
| 1,944,439 | Larsen | Jan. 23, 1934 |
| 2,089,999 | Greene | Aug. 17, 1937 |
| 2,120,918 | Larsen | June 14, 1938 |
| 2,191,116 | Osuch | Feb. 20, 1940 |
| 2,455,417 | Holan et al. | Dec. 7, 1948 |
| 2,616,754 | Stahl | Nov. 4, 1952 |
| 2,632,684 | Anderson | Mar. 24, 1953 |
| 2,722,352 | Dehmel | Nov. 1, 1955 |